United States Patent
Kostandyan et al.

(10) Patent No.: US 11,885,309 B2
(45) Date of Patent: Jan. 30, 2024

(54) WIND TURBINE COOLING SYSTEM

(71) Applicant: Vestas Wind Systems A/S, Aarhus N. (DK)

(72) Inventors: Erik Eduard Kostandyan, Svenstrup (DK); Poul T. Tietze, Brabrand (DK); Sandra Ann Hoffecker, Spjald (DK); Carsten Krogh Nielsen, Hammel (DK)

(73) Assignee: Vestas Wind Systems A/S, Aarhus (DK)

( * ) Notice: Subject to any disclaimer, the term of this patent is extended or adjusted under 35 U.S.C. 154(b) by 337 days.

(21) Appl. No.: 17/294,789

(22) PCT Filed: Nov. 6, 2019

(86) PCT No.: PCT/DK2019/050336
§ 371 (c)(1),
(2) Date: May 18, 2021

(87) PCT Pub. No.: WO2020/103987
PCT Pub. Date: May 28, 2020

(65) Prior Publication Data
US 2022/0128042 A1  Apr. 28, 2022

(30) Foreign Application Priority Data
Nov. 20, 2018  (DK) .......................... PA 2018 70762

(51) Int. Cl.
*F03D 80/60*  (2016.01)

(52) U.S. Cl.
CPC .......... *F03D 80/60* (2016.05); *F05B 2260/20* (2013.01)

(58) Field of Classification Search
CPC ............................. F03D 80/60; F05B 2260/20
See application file for complete search history.

(56) References Cited

U.S. PATENT DOCUMENTS 8,052,383 B2 * 11/2011 Frokjaer ................. F03D 80/60
                                                                 415/178
8,585,358 B2 * 11/2013 Matsuo ..................... F03D 9/25
                                                                 415/176
(Continued)

FOREIGN PATENT DOCUMENTS

| CN | 102859188 A | 1/2013 |
|----|-------------|--------|
| CN | 104956075 A | 9/2015 |

(Continued)

OTHER PUBLICATIONS

Danish Patent and Trademark Office, Search and Examination Report in PA 2018 70762, dated May 2, 2019.
(Continued)

*Primary Examiner* — David E Sosnowski
*Assistant Examiner* — Jason G Davis
(74) *Attorney, Agent, or Firm* — Wood Herron & Evans LLP (57) ABSTRACT

A wind turbine cooling system comprising a cooling circuit arranged to convey a cooling fluid to and from a heat source, a cooling device arranged to cool the cooling fluid, a 5 pump arranged to circulate the cooling fluid in the cooling circuit, and a cooling fluid tank arranged in fluid connection with the cooling circuit and having a first fluid port adjacent a top of the tank and a second fluid port adjacent a bottom of the tank, wherein the second fluid port is arranged to communicate with the cooling circuit, wherein the pump has an outlet arranged in fluid connection with the cooling circuit and in fluid 10 connection with the tank, and wherein a fluid path between the pump outlet and the tank includes a flow restriction device.

17 Claims, 5 Drawing Sheets

(56) References Cited

U.S. PATENT DOCUMENTS

| | | | |
|---|---|---|---|
| 9,982,565 B2 * | 5/2018 | Schmidt | F16C 19/525 |
| 2008/0290662 A1 | 11/2008 | Matesanz Gil et al. | |
| 2010/0329869 A1 * | 12/2010 | Okano | F03D 80/70 |
| | | | 416/174 |
| 2011/0095539 A1 | 4/2011 | Tietze et al. | |
| 2011/0272949 A1 | 11/2011 | Matsuo et al. | |
| 2012/0257970 A1 | 10/2012 | Akashi et al. | |
| 2013/0236308 A1 | 9/2013 | Tietze et al. | |
| 2015/0233265 A1 | 8/2015 | Rohden | |

FOREIGN PATENT DOCUMENTS

| | | |
|---|---|---|
| EP | 2153064 A2 | 2/2010 |
| EP | 2578879 A1 | 4/2013 |
| WO | 2007071239 A1 | 6/2007 |
| WO | 2008131766 A2 | 11/2008 |
| WO | 2011099899 A1 | 8/2011 |

OTHER PUBLICATIONS

European Patent Office, International Search Report and Written Opinion in PCT Application No. PCT/DK2019/050336, dated Jan. 31, 2020.

China National Intellectual Property Admnistration, office action issued in corresponding Chinese Patent Application No. 201980088635.2, dated Apr. 20, 2023, with English translation.

European Patent Office, Examination Report in EP19804626.0, dated Sep. 2, 2022.

* cited by examiner

WIND TURBINE COOLING SYSTEM

FIELD OF THE INVENTION

The present invention relates to a wind turbine cooling system, a wind turbine having the cooling system, and a method of operating a wind turbine cooling system.

BACKGROUND OF THE INVENTION

A wind turbine converts wind power into electrical energy using a generator placed among other wind turbine components in a nacelle. When the generator converts wind power into energy, the walls and the air surrounding the components are heated and the components too are thus heated.

When the components are heated, the efficiency with which the conversion takes place is substantially decreased. In order to cool the components, the walls and the air surrounding the components are cooled down by means of a heat sink positioned on top of the nacelle, a so-called 'cooler top'. Thus, the cool outside air passes through the heat sink and cools a circulating cooling fluid within the heat sink, which is then used to cool the walls and/or the air surrounding the components and, in some instances, the interior of the components by circulating either cooled air or cooling fluid within the components.

The presence of gas or atmospheric air in the cooling fluid reduces the efficiency of the cooling system and can require pump stops and increased need for personnel performing maintenance on the cooling system, and so it is beneficial to minimise the gas content.

To avoid gas in the cooling system, gas needs to be removed during commissioning of the wind turbine generator and/or after any activity in which the cooler top is taken off the wind turbine. In known cooling systems for wind turbines gas can sometimes enter the cooling system even when the system is bled properly to remove the gas. The process is labour intensive and can require the wind turbine to be out of operation for extended periods of time.

If the removal of gas from the cooling system were made easier, the benefits would be appreciable.

SUMMARY OF THE INVENTION

A first aspect of the invention provides a wind turbine cooling system comprising a cooling circuit arranged to convey a cooling fluid to and from a heat source, a cooling device arranged to cool the cooling fluid, a pump arranged to circulate the cooling fluid in the cooling circuit, and a cooling fluid tank arranged in fluid connection with the cooling circuit. The cooling fluid tank has a first fluid port adjacent a top of the tank and a second fluid port adjacent a bottom of the tank. The second fluid port is arranged to communicate with the cooling circuit. The pump has an outlet arranged in fluid connection with the cooling circuit and in fluid connection with the tank. A fluid path between the pump outlet and the tank includes a flow restriction device.

A second aspect of the invention provides a method of operating a wind turbine cooling system including a cooling circuit arranged to convey a cooling fluid to and from a heat source, a cooling device arranged to cool the cooling fluid, a pump arranged to circulate the cooling fluid in the cooling circuit, and a cooling fluid tank arranged in fluid connection with the cooling circuit. The cooling fluid tank has a first fluid port adjacent a top of the tank and a second fluid port adjacent a bottom of the tank. The second fluid port is arranged to communicate with the cooling circuit. The pump has an outlet arranged in fluid connection with the cooling circuit and in fluid connection with the tank. A fluid path between the pump outlet and the tank includes a flow restriction device. The method comprises: during normal operation of the wind turbine cooling system, operating the pump such that a portion of cooling fluid discharged from the pump is passed through the flow restriction device to the tank.

A further aspect of the invention provides a wind turbine having the wind turbine cooling system of the first aspect.

The flow restriction device restricts the flow of cooling fluid in the fluid path. When the cooling fluid enters the tank, gas separates from the cooling fluid, which travels to the bottom of the tank, as the gas travels to the top of the tank because of the gas being less dense than the fluid. The process is fast and continuous such that the gas content in the cooling system is reduced quickly, efficiency is maintained, and wind turbine operation is uninterrupted as far as possible.

The flow restriction device may have an aperture sized to promote return to the tank of any gas in the cooling fluid through the flow restriction device to the tank during operation of the pump.

The flow restriction device may be operable in a first configuration in which the device is open to permit substantially free flow of fluid therethrough and in a second configuration in which the device is partially closed to permit restricted fluid flow through an aperture.

The fluid path between the pump outlet and the tank may include a bypass around the flow restriction device, the bypass having a bypass valve.

The flow restriction device may be an orifice valve.

The first fluid port may be positioned above a level of cooling fluid in the tank.

The second fluid port may be positioned below a level of cooling fluid in the tank.

The wind turbine cooling system may further comprise an additional fluid path between the cooling circuit and the tank for discharging cooling fluid from the cooling circuit to the top of the tank.

The additional fluid path may be arranged to discharge fluid from the cooling circuit to the tank via the first fluid port.

The additional fluid path may include a valve for selective opening and closing of the additional fluid path.

The pump outlet may have a first outlet port coupled in fluid connection with the cooling circuit, and a second outlet port in fluid connection with the first fluid port of the tank.

The cooling device may be a radiator. The cooling device may preferably be an air cooled radiator.

The heat source may comprise one or more wind turbine components.

The one or more wind turbine components may be housed in a nacelle. The air cooled radiator may be located outside the nacelle.

The method may further comprise: during a commissioning operation of the wind turbine cooling system, opening or bypassing the flow restriction device to permit substantially free flow of the cooling fluid through or past the flow restriction device, and operating the pump of the wind turbine cooling system such that gas in the cooling circuit is discharged from the pump and directed to the tank.

The cooling circuit may include a valve arranged to provide a first configuration in which the valve is open such that the cooling circuit is open and a second configuration in which the valve is closed such that the cooling circuit is closed, and during the commissioning operation of the wind turbine cooling system the method may further comprise: starting operating the pump prior to opening the valve of the cooling circuit and then opening or bypassing the flow restriction device.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
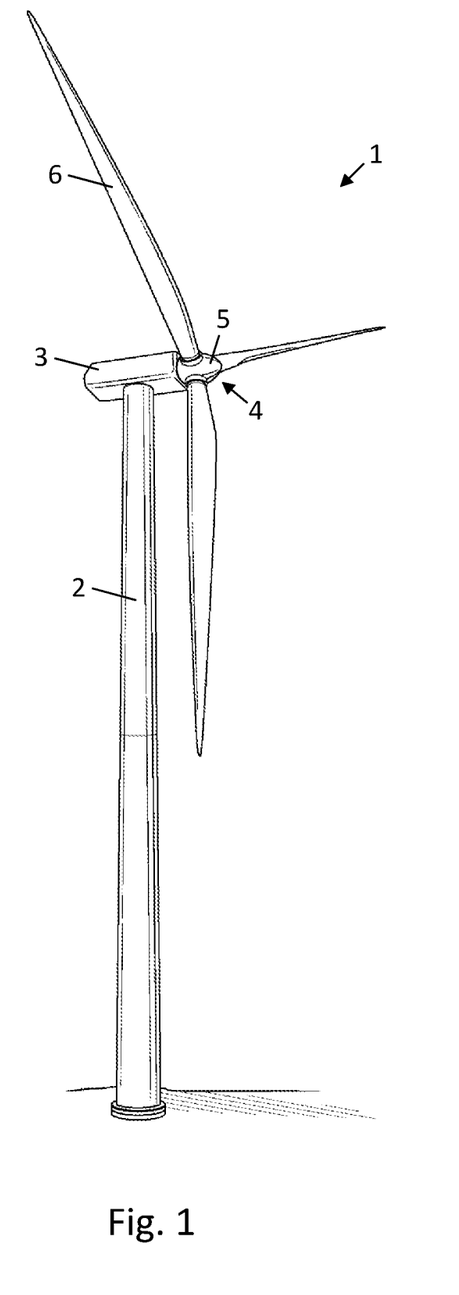
FIG. 1 shows a wind turbine.

FIG. 1 shows a wind turbine 1 including a tower 2 mounted on a foundation and a nacelle 3 disposed at the apex of the tower 2. The wind turbine 1 depicted here is an onshore wind turbine such that the foundation is embedded in the ground, but the wind turbine 1 could be an offshore installation in which case the foundation would be provided by a suitable marine platform.

A rotor 4 is operatively coupled via a gearbox to a generator housed inside the nacelle 3. The rotor 4 includes a central hub 5 and a plurality of rotor blades 6, which project outwardly from the central hub 5. It will be noted that the wind turbine 1 is the common type of horizontal axis wind turbine (HAWT) such that the rotor 4 is mounted at the nacelle 3 to rotate about a substantially horizontal axis defined at the centre at the hub 5. While the example shown in FIG. 1 has three blades, it will be realised by the skilled person that other numbers of blades are possible.

When wind blows against the wind turbine 1, the blades 6 generate a lift force which causes the rotor 4 to rotate, which in turn causes the generator within the nacelle 3 to generate electrical energy. This process generates considerable heat inside the nacelle, particularly in and around the generator. To counter any significant rises in temperature, the wind turbine is fitted with a cooling system.

Figure 2:
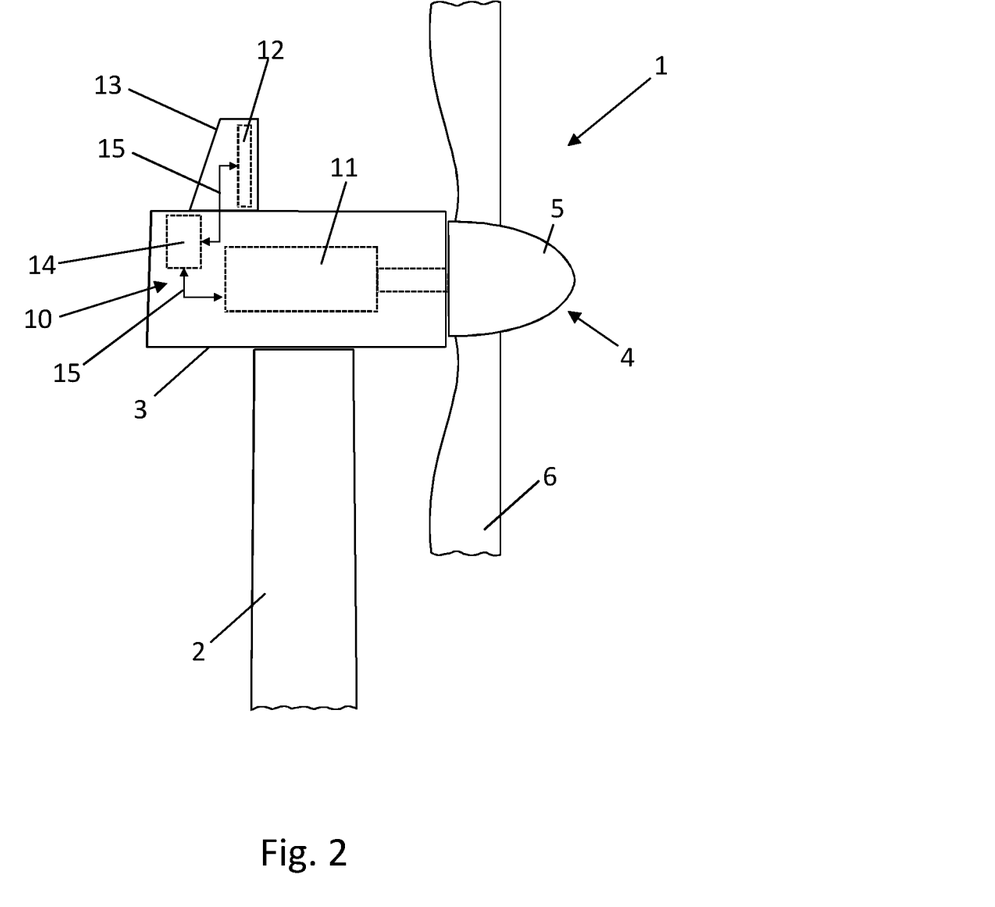
FIG. 2 shows a portion of the wind turbine of FIG. 1 including a cooling system.

FIG. 2 shows a cooling system 10 arranged to convey a cooling fluid between a heat source 11 and a cooling device 12 so that heat from the heat source 11 is dissipated by the cooling device 12. The heat source 11 is preferably a generator, although could appropriately be any source of heat, such as a brake, gearbox, or clutch, or a combination of one or more wind turbine components. The cooling system 10 may therefore cool multiple wind turbine components concurrently, or be adapted and controlled to selectively cool different components as required.

The cooling fluid is conveyed by a pump system 14 through a cooling circuit 15 towards the cooling device 12, which is preferably located outside the nacelle in a cooler top 13. The cooling device 12 may be a radiator having a high surface area such that heat is transferred rapidly from the cooling fluid to the atmosphere. Preferably the cooling device 12 is an air cooled radiator that uses the wind to increase the transfer of heat. The cooling fluid is then conveyed back through the cooling circuit 15 towards the heat source 11. The cooling fluid may be any liquid having a cooling capacity and properties suitable for the given installation. An example of a suitable cooling fluid may be glycol, or predominantly composed of glycol.

Figure 3:
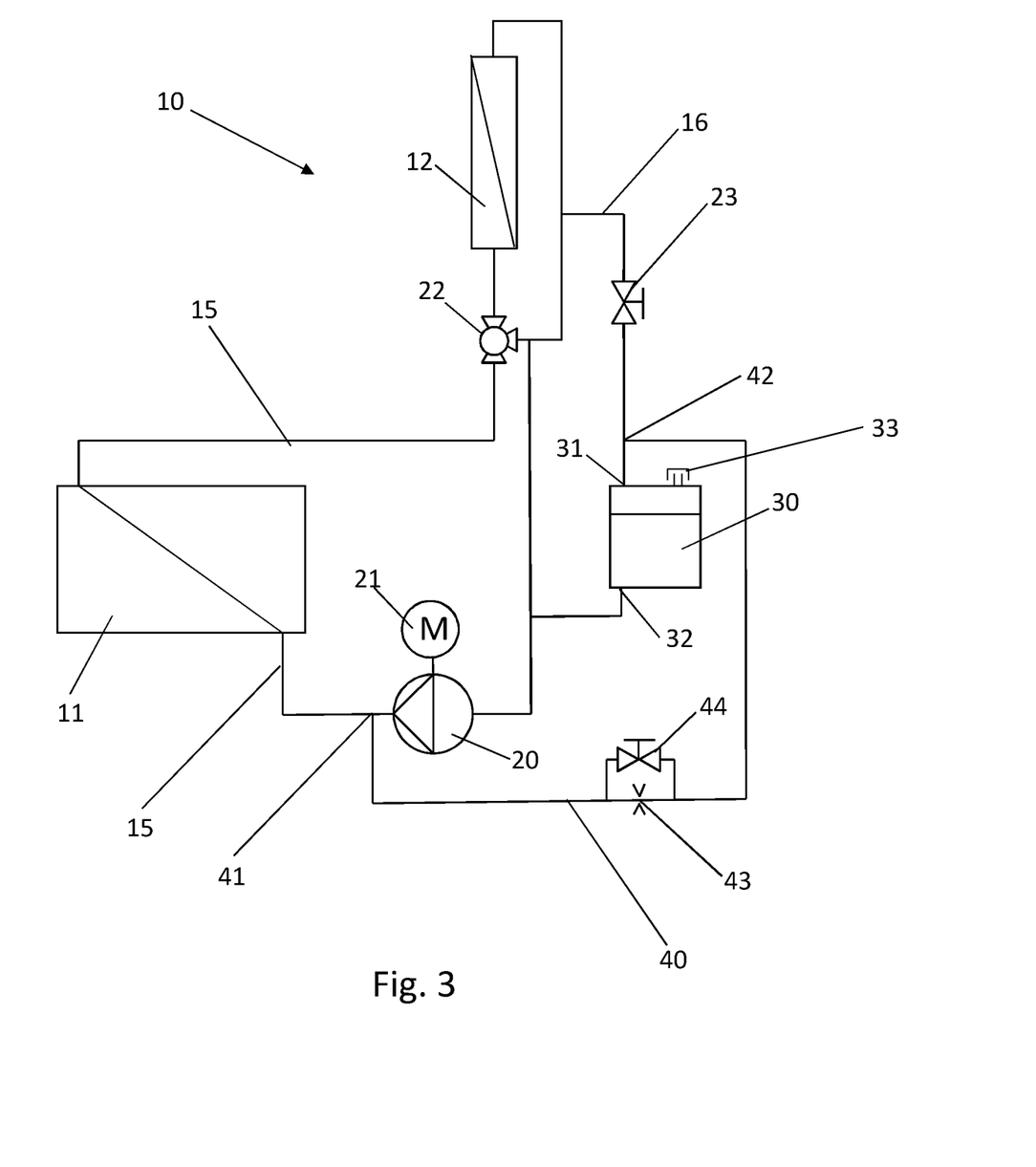
FIG. 3 shows a first example of a wind turbine cooling system.

FIG. 3 shows an example of the cooling system 10, the cooling system 10 including a pump 20 driven by a motor 21 to convey cooling fluid around the cooling circuit 15. The pump 20 may be any suitable pump, such as a centrifugal pump, or reciprocating pump or rotary pump. The cooling fluid is conveyed from the pump 20 to the heat source 11. After the cooling fluid has passed the heat source 11 the cooling fluid enters a three-way valve 22. The three-way valve is controlled by the temperature of the cooling fluid in relation to a pre-set control temperature or the operational mode of the cooling system. If the cooling fluid temperature is below the pre-set temperature, then the cooling fluid is not travelling to the cooling device 12 instead it recirculates through the pump 20 directly. If the cooling fluid temperature is above the pre-set temperature, then the cooling fluid can travel through the cooling device 12, in order to remove excess heat before it recirculates through the pump 20.

A fluid tank 30 is connected in parallel with the main cooling circuit 15 to add or remove cooling fluid from the cooling circuit, so acting as a cooling fluid reservoir. The fluid tank 30 is connected via an additional fluid path 16 with a valve 23, which is used in the commissioning, servicing and decommissioning of the cooling system 10. The valve 23 of the additional fluid path 16, may be a solenoid valve, stop valve, plug valve, or other suitable valve for selectively controlling the flow of cooling fluid. This arrangement allows the cooling device 12 to communicate directly with the fluid tank 30, so that servicing of the system is easier.

The fluid tank 30 includes a gas release valve 33 that vents to prevent an over or under pressure in the fluid tank 30.

During commissioning of the wind turbine 1, or maintenance on the cooling device 12, gas can be introduced into the cooling system 10 that reduces its efficiency. Gas will tend to rise in the cooling device 12 and displace cooling fluid into the fluid tank 30. Gas can also gradually be introduced into the cooling system 10 during operation of the wind turbine 1, e.g. via the pump 20, and thereby can necessitate regular maintenance of the cooling system 10 to remove gas. To evacuate the gas from the cooling circuit 15, the outlet of the pump 20 is additionally connected via a gas return fluid path 40 to the fluid tank 30, where the gas return fluid path 40 includes a flow restriction device 43. The fluid tank 30 allows relief of gas entrained in the cooling fluid.

In the embodiment shown in FIG. 3, the gas return fluid path 40 is connected to the cooling circuit 15 just downstream of the outlet of the pump 20 at a first port 41 such that, during operation of the pump 20, a portion of the cooling fluid in the cooling circuit 15 can be diverted through the gas return fluid path 40 and towards the fluid tank 30 via a second port 42 on the additional fluid path 16 in fluid connection with the first fluid port 31 of the fluid tank 30.

The flow restriction device 43 may be a fixed aperture device, e.g. an orifice plate, an orifice valve or needle valve, which restricts the flow of cooling fluid through the gas return fluid path 40 such that the desired pressure is maintained in the cooling circuit. The flow restriction valve 43 has an orifice which may have a circular aperture, square aperture, or any other suitably shaped aperture, and the aperture may be variable in size, up to and including an aperture size in which the flow is substantially unrestricted, when desired. The orifice may include multiple apertures of constant or variable size. In this way, the size of the orifice is optimised for the particular requirements of the cooling system 10, which may vary depending on a number of factors such as the pressure of cooling fluid in the system, the temperature of the cooling fluid, the size of the cooling circuit 15, or the quantity of gas in the cooling system 10.

The gas return fluid path 40 can include a bypass circuit around the flow restriction device 43 with a bypass valve 44. The bypass valve 44 is typically closed during normal operation of the cooling system 10. The bypass valve 44 can be used whenever a high flow rate through the gas return fluid path 40 is required, e.g. during commissioning of the cooling system 10.

The flow restriction device 43, during normal operation of the cooling system 10, performs a continuous active bleeding of cooling fluid from the pump outlet to return gas to the fluid tank 30 at all times whenever the pump 20 of the cooling system 10 is operating.

Figure 4:
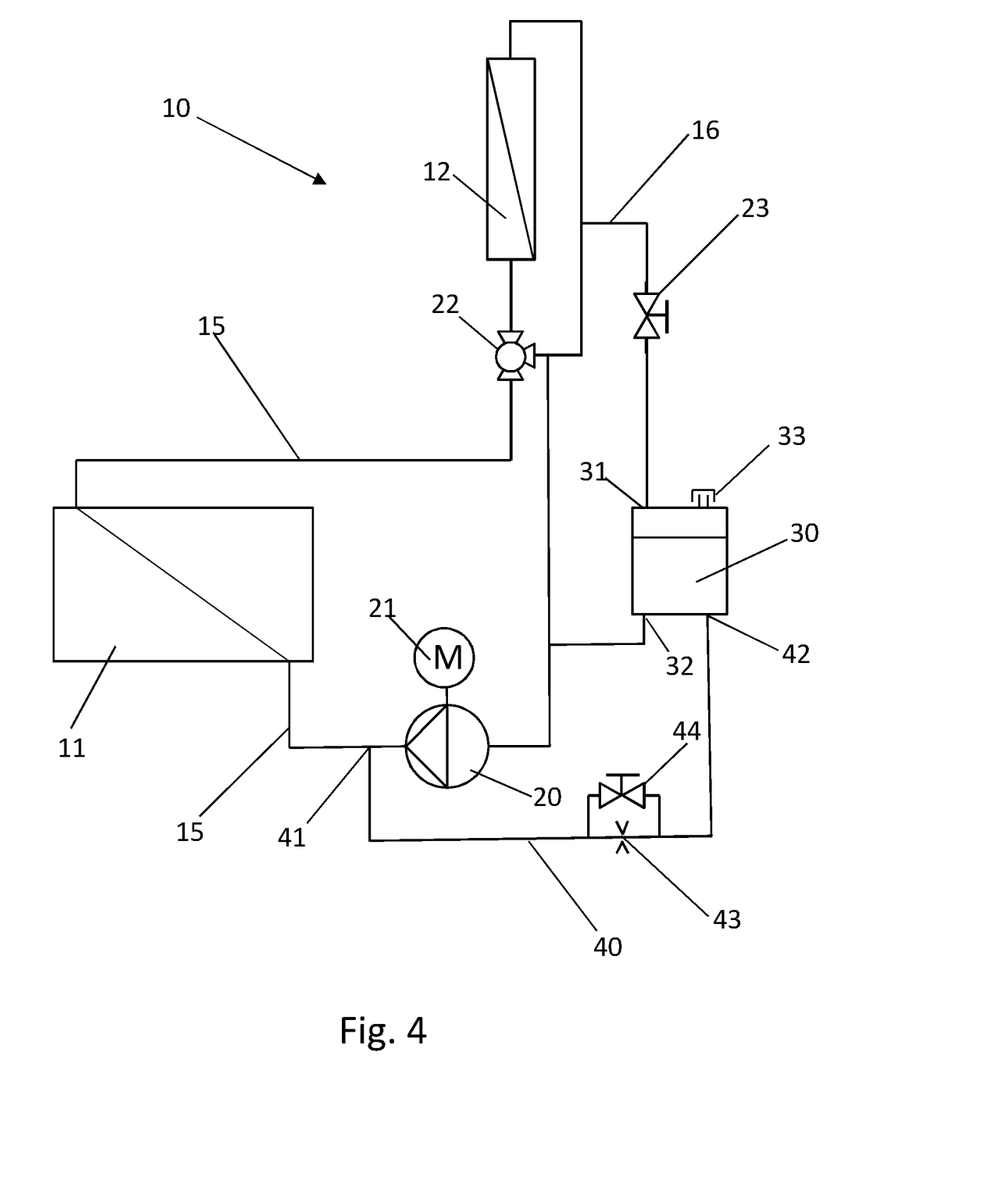
FIG. 4 shows a second example of a wind turbine cooling system.

In a second example shown in FIG. 4, the second port 42 is located on the fluid tank 30 below the level of cooling fluid. The gas return fluid path 40 is connected to the cooling circuit 15 just downstream of the outlet of the pump 20 at a first port 41 such that, during operation of the pump 20, a portion of the cooling fluid in the cooling circuit 15 can be diverted through the gas return fluid path 40 and towards the fluid tank 30 via the second port 42, making the travelling distance of the gas return fluid path 40 shorter compared to the embodiment shown in FIG. 3.

Like reference numerals are used to denote like parts with the first example shown in FIG. 3.

Figure 5:
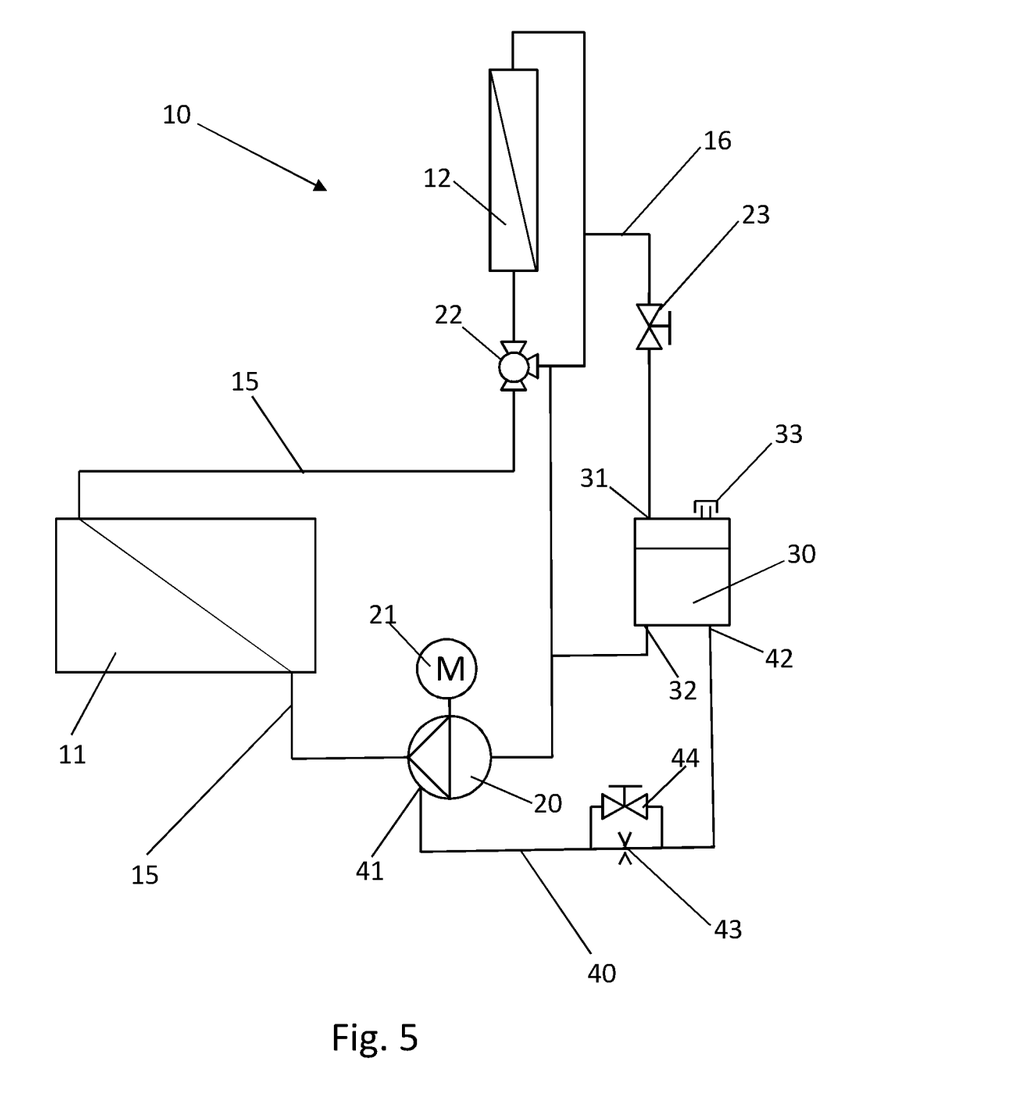
FIG. 5 shows a third example of a wind turbine cooling system.

In a third example shown in FIG. 5, the first port 41 of the gas return fluid path 40 is connected directly to an outlet port on the pump 20 at its high-pressure side. Like reference numerals are used to denote like parts with the second example shown in FIG. 4. The pump 20 may have a single outlet with branches to both the cooling circuit 15 and the gas return fluid path 40. Alternatively, the pump 20 may have multiple outlets, one connected in the cooling circuit 15 and another connected to the gas return fluid path 40. Where the pump 20 has multiple outlets, these may be at the same or different fluid pressures. If the pump outlet pressures are different, the gas return fluid path 40 may be connected to the outlet with the highest pressures.

In this example, the second port 42 of the gas return fluid path is again located below the level of cooling fluid in the fluid tank 30 as in second example shown in FIG. 4, although the second port 42 may alternatively be located above the level of cooling fluid in the fluid tank 30 as shown in the first example of FIG. 3.

As an alternative the first port 41 of the gas return fluid path 40 can be connected to any other position in the cooling circuit 45, where the pressure is sufficient for effecting the flow of cooling fluid through the gas return fluid path 40.

It will be appreciated that the figures are purely schematic and the relative positions of the various components may differ from those shown.

Although the invention has been described above with reference to one or more preferred embodiments, it will be appreciated that various changes or modifications may be made without departing from the scope of the invention as defined in the appended claims.

The invention claimed is:

1. A wind turbine cooling system comprising a cooling circuit arranged to convey a cooling fluid to and from a heat source, a cooling device arranged to cool the cooling fluid, a pump arranged to circulate the cooling fluid in the cooling circuit, and a cooling fluid tank arranged in fluid connection with the cooling circuit and having a first fluid port adjacent a top of the tank and a second fluid port adjacent a bottom of the tank, wherein the second fluid port is arranged to communicate with the cooling circuit, wherein the pump has an outlet arranged in fluid connection with the cooling circuit and in fluid connection with the tank, and wherein a fluid path between the pump outlet and the tank is arranged such that gas in the cooling fluid in the cooling circuit is discharged from the pump and directed to the tank through the fluid path.

2. The wind turbine cooling system according to claim 1, wherein the fluid path between the pump outlet and the tank includes a flow restriction device having an aperture sized to promote return to the tank of any gas in the cooling fluid through the flow restriction device to the tank during operation of the pump.

3. The wind turbine cooling system according to claim 1, wherein the fluid path between the pump outlet and the tank includes a flow restriction device, and wherein the flow restriction device is operable in a first configuration in which the flow restriction device is open to permit substantially free flow of fluid therethrough and in a second configuration in which the flow restriction device is partially closed to permit restricted fluid flow through an aperture.

4. The wind turbine cooling system according to claim 1, wherein the fluid path between the pump outlet and the tank includes a flow restriction device, and wherein the fluid path between the pump outlet and the tank includes a bypass around the flow restriction device, the bypass having a bypass valve.

5. The wind turbine cooling system according to claim 1, wherein the fluid path between the pump outlet and the tank includes a flow restriction device, and wherein the flow restriction device is an orifice valve.

6. The wind turbine cooling system according to claim 1, wherein the first fluid port is positioned above a level of cooling fluid in the tank.

7. The wind turbine cooling system according to claim 1, wherein the second fluid port is positioned below a level of cooling fluid in the tank.

8. The wind turbine cooling system according to claim 1, further comprising an additional fluid path between the cooling circuit and the tank for discharging cooling fluid from the cooling circuit to the top of the tank.

9. The wind turbine cooling system according to claim 8, wherein the additional fluid path is arranged to discharge fluid from the cooling circuit to the tank via the first fluid port.

10. The wind turbine cooling system according to claim 8, wherein the additional fluid path includes a valve for selective opening and closing of the additional fluid path.

11. The wind turbine cooling system according to claim 1, wherein the pump outlet has a first outlet port coupled in fluid connection with the cooling circuit, and a second outlet port in fluid connection with the first fluid port of the tank.

12. The wind turbine cooling system according to claim 1, wherein the cooling device is a radiator.

13. The wind turbine cooling system according to claim 12, wherein the heat source comprises one or more wind turbine components.

14. The wind turbine cooling system according to claim 13, wherein the one or more wind turbine components are housed in a nacelle, and the radiator is located outside the nacelle.

15. A method of operating a wind turbine cooling system including a cooling circuit arranged to convey a cooling fluid to and from a heat source, a cooling device arranged to cool the cooling fluid, a pump arranged to circulate the cooling fluid in the cooling circuit, and a cooling fluid tank arranged in fluid connection with the cooling circuit and having a first fluid port adjacent a top of the tank and a second fluid port adjacent a bottom of the tank, wherein the second fluid port is arranged to communicate with the cooling circuit, wherein the pump has an outlet arranged in fluid connection with the cooling circuit and in fluid connection with the tank, and wherein a fluid path between the pump outlet and the tank includes a flow restriction device, the method comprising:

during normal operation of the wind turbine cooling system, operating the pump such that a portion of cooling fluid discharged from the pump is passed through the flow restriction device to the tank; and     operating the pump of the wind turbine cooling system such that gas in the cooling fluid in the cooling circuit is discharged from the pump and directed to the tank.

16. The method according to claim 15, further comprising:

during a commissioning operation of the wind turbine cooling system, opening or bypassing the flow restriction device to permit substantially free flow of the cooling fluid through or past the flow restriction device.

17. A wind turbine cooling system comprising a cooling circuit arranged to convey a cooling fluid to and from a heat source, a cooling device arranged to cool the cooling fluid, a pump arranged to circulate the cooling fluid in the cooling circuit, and a cooling fluid tank arranged in fluid connection with the cooling circuit and having a first fluid port adjacent a top of the tank and a second fluid port adjacent a bottom of the tank, wherein the second fluid port is arranged to communicate with the cooling circuit, wherein the pump has an outlet arranged in fluid connection with the cooling circuit and in fluid connection with the tank, wherein a fluid path between the pump outlet and the tank includes a flow restriction device, and wherein the flow restriction device is configured to promote return to the tank of any gas in the cooling fluid.

\* \* \* \* \*